Figure 1:
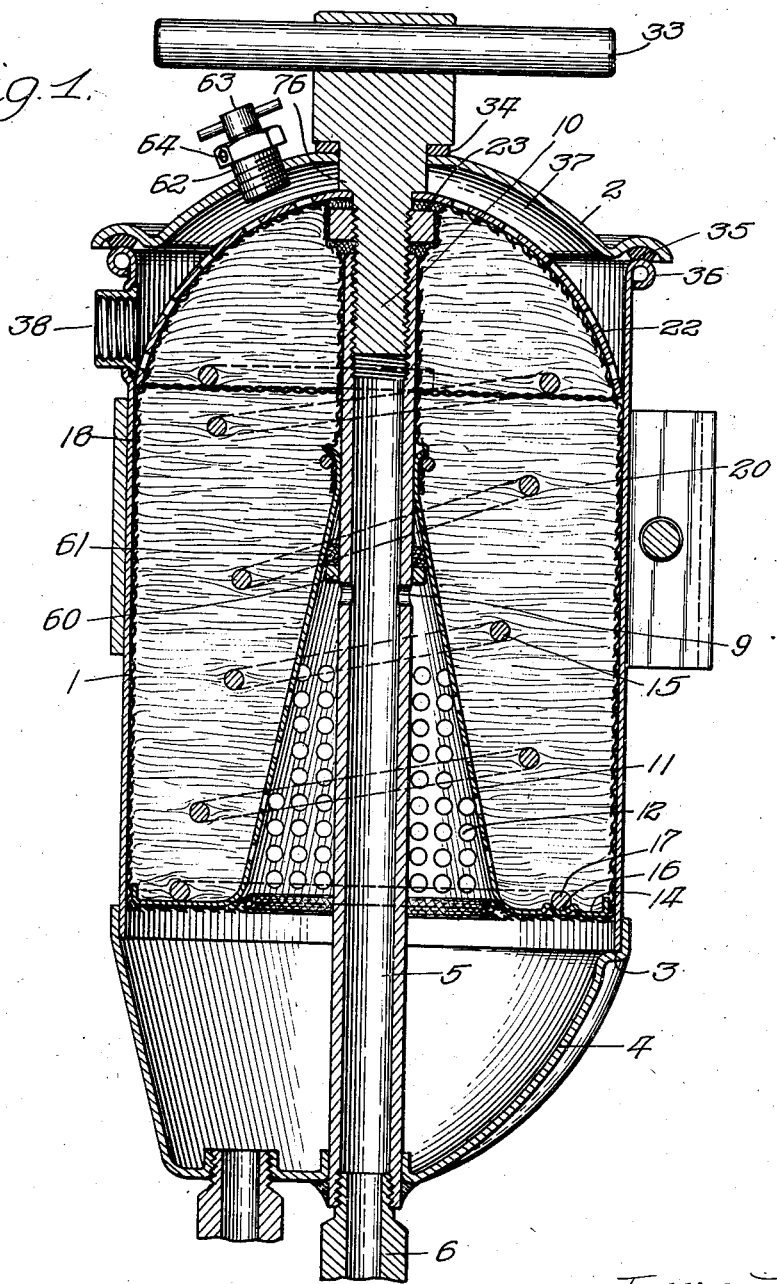

Aug. 1, 1939.　　　J. E. HURN　　　2,168,125

FUEL OIL FILTER CARTRIDGE

Filed Dec. 7, 1936　　　3 Sheets-Sheet 1

Inventor:
James E. Hurn,
By Dyrenforth, Lee, Chritton & Wiles,
Attys.

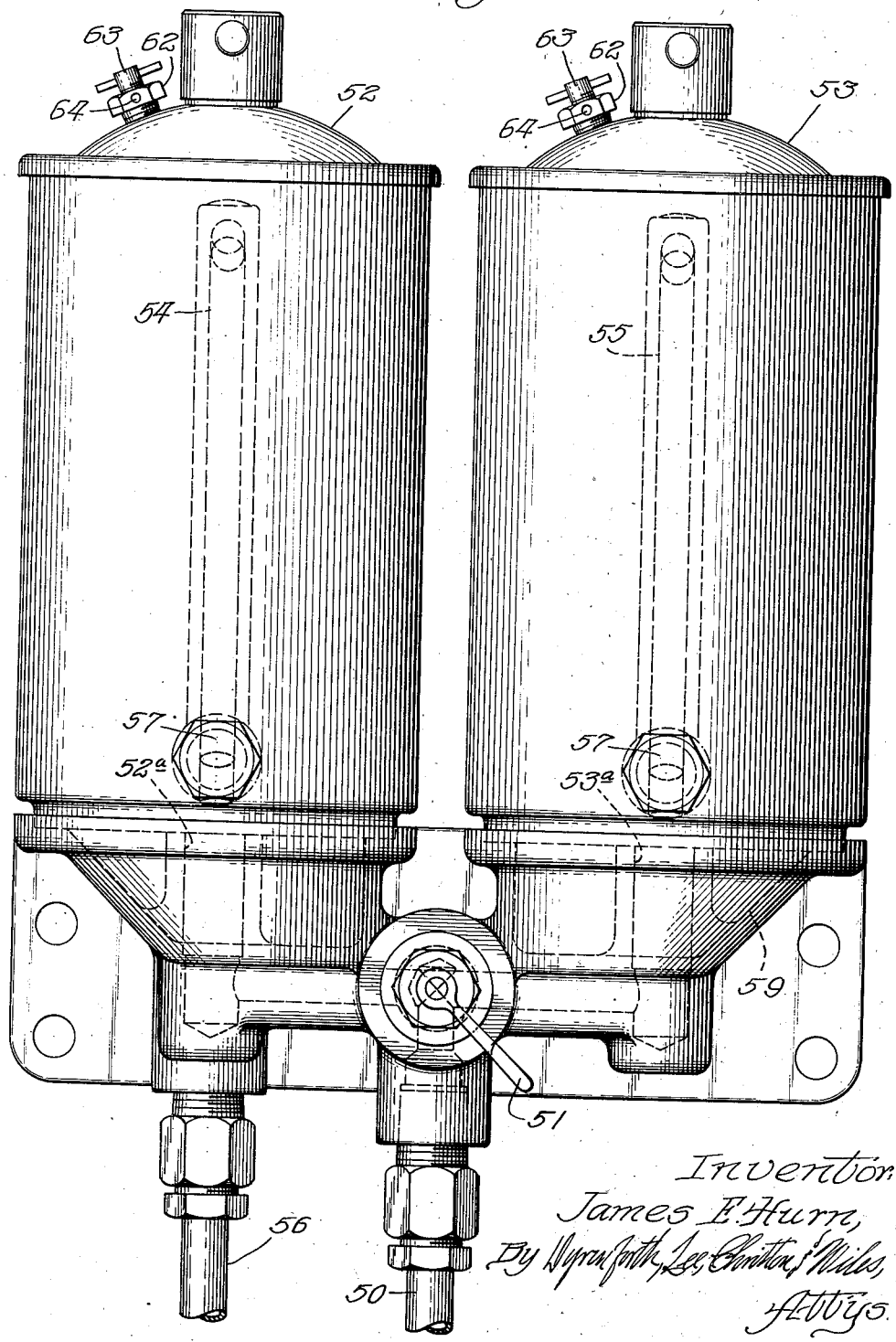

Aug. 1, 1939.          J. E. HURN                2,168,125
                 FUEL OIL FILTER CARTRIDGE
                 Filed Dec. 7, 1936        3 Sheets-Sheet 3
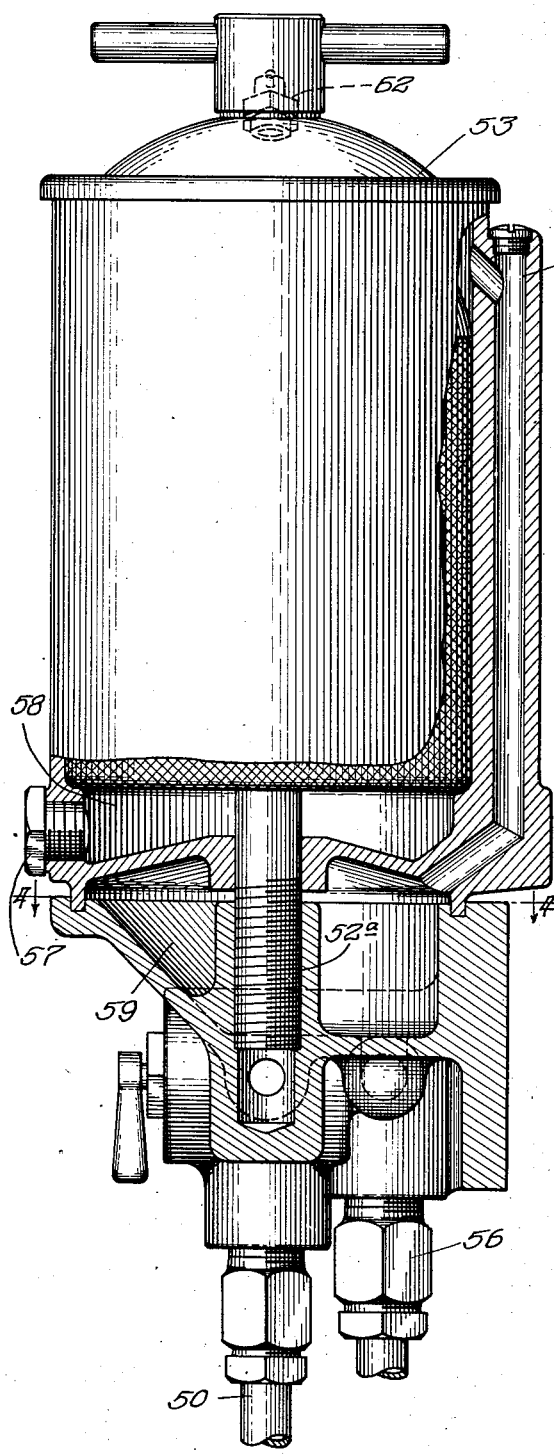
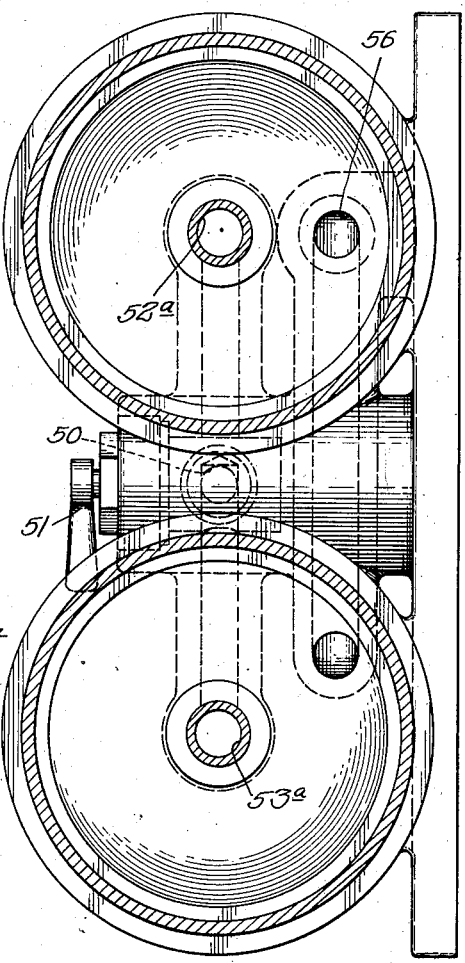
Inventor:
James E. Hurn, Patented Aug. 1, 1939

2,168,125

UNITED STATES PATENT OFFICE 2,168,125

FUEL OIL FILTER CARTRIDGE

James E. Hurn, La Porte, Ind., assignor to De Luxe Products Corporation, a corporation of Indiana Application December 7, 1936, Serial No. 114,699

3 Claims. (Cl. 210—131)

This invention relates to a fuel oil filter cartridge and more particularly to a cartridge designed for use in connection with internal combustion engines of the Diesel type.

In my co-pending applications, Ser. No. 69,217, filed March 16, 1936, and Ser. No. 98,250, filed August 27, 1936, are described filter cartridges suitable for employment in the lubricating systems in internal combustion engines. In connection with engines which burn fuel oil, it is highly desirable that the fuel oil be completely free from certain ingredients which are permissible in lubricating oil. These are principally water, but also include waxes. The cartridges described in the above applications, when used in connection with fuel oil, are entirely suitable for the removal of water in unemulsified form and for the removal of solid materials from such fuel oil. Highly emulsified water in the oil and soluble waxes will not be completely removed in a single passage through such a filter, however.

It has now been discovered that by substantially increasing the density of packing of the cartridge, without however destroying its essentially adsorbent character, emulsified water and waxes may be removed from fuel oil in a single passage of the oil through the cartridge.

The invention is illustrated in the drawings, in which—

Fig. 1 is a vertical section of a filter including a cartridge; Fig. 2 is an elevation of a pair of filters on a fuel oil line; Fig. 3 is a side elevation of Fig. 2; and Fig. 4 is a cross section of the pair of filters of Fig. 2, taken on line 4—4.

As illustrated in the drawings, 1 represents a filter housing, 2 is a cover enclosing the top thereof, and 4 represents a sump portion which is provided with a shoulder 3 adapted to support the cartridge. A tubular member 5 is fixedly seated in the bottom of the sump 4 and extends upwardly and centrally through the filter. The upper end of the tube is preferably threaded and a threaded extension 10 fitted therein. At the base of the filter an oil inlet 6 is provided which is connected to the fuel line leading to the internal combustion engine. In an upper portion of the tube 2, openings 9 are provided through which oil is passed in a rapidly moving thin stream against the cone 11. This cone is preferably made of rigid material, for example, thin sheet metal, and preferably is integrally connected to the filter cartridge. Its upper portion is unbroken and its lower portion is provided with a large number of small perforations 12 through which oil passes into the filtering medium 13. The base 14 of the cone is seated upon the shoulder 3 of the sump 4.

Within the cartridge are provided means for supporting the normal resistance of the filtering medium to compression, which is shown in the form of a helical spring 15 fixed to the base 14 by welding, or preferably by insertion of an end 16 of the spring in a groove 17 of the base. However, the cartridge may be made self-supporting by proper interweaving of fibers, or may be supported by resilient fibers such as hog hair, as shown in my co-pending application, Ser. No. 98,250, filed August 27, 1936. Likewise, various combinations of these expedients may be employed as, for example, some hair may be mixed with cellulosic fibers and all supported by a steel helix.

The filtering medium preferably consists of cellulosic fibers which should be extremely long and interconnected to prevent any possibility of channeling of the oil and should be dense enough to prevent compression, but not too dense to prevent free seepage of oil therethrough.

A sack or bag 18 is attached to the top 19 of the cone 11 and surrounds the filtering medium, its other end 20 being fastened over the base of the cone, for example, by a shirring-string.

The cartridge 20, so formed, fits about the tubular member 5 and within the housing 1. The fit on the sides is tight enough to form an oil seal. The cartridge is surmounted by the perforated cap 22. The nut 23 is threaded on the extension 10, thus securing the cap 23 to it as a unit and permitting removal of the cover at the same time that the extension 10 is removed. The cap 23 likewise serves the function of pressing the top of the cartridge upon the tube 5 to form or assist in forming a seal about the tube. This seal, in the case of fuel oil, is aided by the use of a sleeve 60 fastened about the central tube 5, above which is a gasket 61 sealing the central tube against possible leakage. The upper portion of the extension 10 forms an enlarged knob 32, which is transversely pierced by the handle 33.

The cover 2 is seated about the extension 10 below the knob and the washer 34 and likewise may be integrally removed with the cover 22. A gasket 35 is provided between the cover 2 and the shoulder 36 of the housing. A chamber 37 is formed between the cover 23 of the cartridge and the cover 2 of the housing and from this the outlet 38 is connected in any suitable manner to the crankcase. The opening 38 is large enough to remove all oil filtered through or passed through the valve 25 without building any substantial pressure in the chamber 37.

A drain 39 fitted with a plug 40 is provided at the base of the sump. A wire handle is connected to the base of the cartridge through the helix.

An air vent 62 is provided at the top of the filter, which comprises a screw valve 63 which opens or closes the vent 64. This vent is provided so that air may be vented from the filter after the cartridge is changed and thus prevent it from getting into the oil line where it would cause misfiring of the cylinders and might cushion in the high pressure engine nozzles.

The filling material of the cartridge is preferably pure cotton thread, free from lint and short ends, for example, what is known in the trade as thread stock in knotted form, consisting of broken bobbins of various size threads between 40 and 70 is preferably employed. These threads are carded and formed into long ribbons which are wound spirally about an axis to form the cartridge. In connection with filter cartridges for use on fuel oil, the tension provided is such that about nine ounces of the cotton fibers will occupy 62 cubic inches of cartridge space. This is approximately 20% more than is employed for a lubricating oil filter.

Such a cartridge removes emulsified water and wax substantially completely from the oil. Peculiarly enough, the filtering medium holds the water which it has removed from the oil as long as the oil passes through it (up to saturation point for water), but when the passage of the oil stops, the water gradually settles out of the filtering medium. It is, therefore, possible to use a pair of filters, particularly in combination with a motor which runs continuously for long periods, and obtain greater life from each of the filter cartridges than would be possible with two cartridges, each operated all the time.

The device shown in Fig. 2 illustrates such a dual system. In this modification, the fuel oil enters at 50 and is directed by the valve 51 to either filter 52 or 53 through the lines 52ᵃ and 53ᵃ. After passing through the filter, it leaves through the line 54 or 55, as the case may be, connecting to line 56 which leads to the injection pump. In operation, as one cartridge tends to become saturated with water, the filter is shut off and water allowed to drain therefrom when the other filter is being used. Likewise, when a cartridge becomes saturated with dirt the filter may be disconnected and the cartridge changed without interrupting the use of the engine. Water may be drained, of course from the plug 57.

In this form of filter, the sump is provided at 58 and the opening 59 is a chamber for the filtered oil.

The foregoing detailed description has been given for clearness of understanding only and no unnecessary limitations should be understood therefrom, but the appended claims should be construed as broadly as permissible in view of the prior art.

I claim:

1. A filter cartridge for filtering fuel oil comprising a mass of fibrous absorbent cellulosic material packed tightly enough to contain approximately nine ounces of absorbent material for sixty-two cubic inches of space.

2. A filter cartridge as set forth in claim 1, in which means are associated with the cellulosic material for supporting it at said density of nine ounces of material for 62 cubic inches of space.

3. A filter cartridge as set forth in claim 1, in which a metallic helix is embodied in the cellulosic material, the cellulosic material being wound about and among the convolutions of the helix and supported thereby.

JAMES E. HURN.